July 20, 1965

J. GOFFIN ETAL 3,195,185

APPARATUS FOR INJECTION MOLDING

Filed Feb. 8, 1962

INVENTORS.
Jules Goffin,
Sol Soroca.

by Erwin Koppel

ATTORNEY.

United States Patent Office 3,195,185
Patented July 20, 1965

3,195,185
APPARATUS FOR INJECTION MOLDING
Jules Goffin, 8756 Francis Lewis Blvd., New York, N.Y., and Sol Soroca, 722 Carlisle Road, Jericho, N.Y.
Filed Feb. 8, 1962, Ser. No. 171,860
3 Claims. (Cl. 18—30)

This invention relates to a novel apparatus for injection molding and is particularly concerned with the use of a reusable portable injection chamber for a thermoplastic material filled cartridge to effect rapid injection molding cycles.

In injection molding it is frequently desired to make successive molds of different forms or different compositions. This type of injection molding generally involves a manual operation in which a different flask is inserted for each cycle to give the desired mold shape. The injection molding operation is performed on the individual flask, and it is possible that different molding materials may be used on successive flasks. To carry out such operations, for example, in making dentures in the dental field, a series of flasks are prepared, each one having a different mold therein. The desired thermoplastic material is placed in cartridges and each cartridge is successively placed in the injection molding machine to form the molded part. In such operation it has been customary to have an enclosed heating unit or enclosed heating chamber on the injection machine. The thermoplastic material filled cartridge is placed in the enclosed heating chamber and brought up to the desired temperature, which may take as long as fifteen to twenty minutes. When the desired temperature is reached, the injection machine is operated to force the thermoplastic material into the mold by actuating a piston ram. This individual operation is seen to involve considerable time, and difficulty is encountered in achieving and maintaining the correct molding temperature for the thermoplastic material. Upon completion of the operation, the filled flask is removed and a new flask placed in the machine. The exhausted cartridge is also removed, and here again some difficulty is encountered since it has to be removed from inside of the enclosed heating chamber. After removal of the exhausted and crushed cartridge, a new thermoplastic material filled cartridge would be inserted in the heating chamber, and the heating operation would be commenced for the next operative cycle. As indicated above, the prior art method of operation has not been satisfactory due to the long time interval between cycles, the difficulty of maintaining the correct molding temperature of the thermoplastic material, and the difficulty of inserting and removing the cartridges from inside the heating chamber.

In the prior art the operative cycle has been shortened by using a hopper fed machine. However, this involves having a large number of elements of the same thermoplastic material in the machine, and when it is desired to change the color or composition of the thermoplastic material, the machine must first be cleaned and purged of the old thermoplastic material, which takes considerable time and effort.

It is another object of the present invention to provide apparatus for injection molding wherein an unenclosed holding assembly is provided for a cartridge that has been remotely heated.

It is a further object of the present invention to provide apparatus for injection molding whereby an unenclosed holding assembly is provided for a thermoplastic material filled cartridge inserted in a portable injection chamber that has been remotely heated.

It is a still further object of the present invention to provide an injection molding machine that is inexpensively manufactured, easily operated and produces a plurality of different molded parts in complete cycles of less than a minute duration.

These and other objects will be apparent from the following description when read in connection with the drawings, in which.

Figure 2:
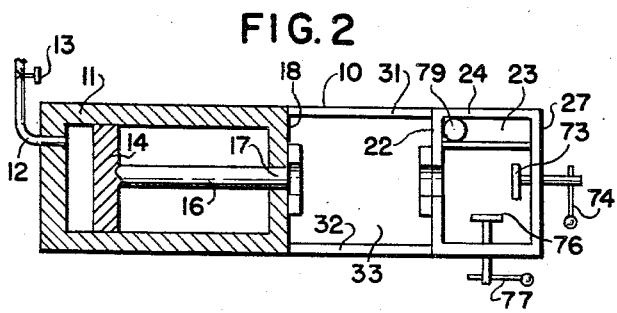
FIG. 2 is a plan view, partly in section, of the machine shown in FIG. 1 with the piston ram in retracted position.
Figure 3:
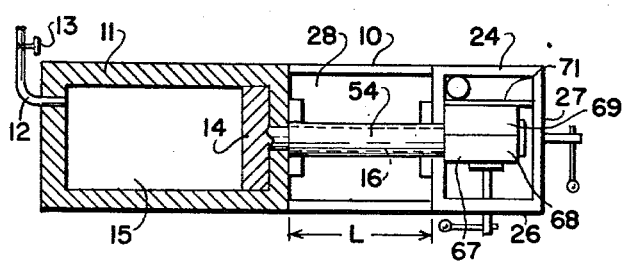
FIG. 3 is a view similar to FIG. 2 with a cylindrical cartridge and portable injection chamber shown in operative position and the piston ram in its extended position.

Referring to FIG. 2 an injection molding machine 10 is shown with a piston ram assembly 11 at one end thereof. A pressure line 12 is connected to ram assembly 11 and includes a valve 13 for controlling an air pressure supply from a source (not shown). When the valve 13 is opened, air pressure drives piston 14 and piston ram 16 to the end of the piston chamber 15, which is to the right as shown in FIGS. 2 and 3.

Upon pressure actuation, piston ram 16 slides through opening 17 formed in a wall 18 of the injection molding machine. Wall 18 forms one end of piston chamber 15. When piston 14 reaches wall 18, as shown in FIG. 3, piston ram 16 has completed its operative stroke and is ready to be returned to its retracted position, as shown in FIG. 2. Return of piston 14 can be effected by a valve arrangement allowing the same air pressure to be used on the other side of piston 14. A spring arrangement can also be used which would bias piston 14 to the left, as shown in FIGS. 2 and 3, so that when the air pressure is exhausted, the spring bias will force piston 14 to the retracted position. Alternatively, a spring arrangement can be used to actuate piston 14 by forcing piston 14 to the left, such as with the use of air pressure, to compress and cock a spring. Upon release of the compressed spring, the released force will thereupon drive the piston to the right into the extended position of FIG. 3. Although the injetcion machine is shown in a generally horizontal position, it is also possible to set up the machine vertically so that the piston will operate up and down.

Remotely positioned from wall 18 is another wall 22 forming one end of an enclosure or flask chamber 23. Parallel side walls 24 and 26 extend from wall 22 and are joined with an end wall 27 to complete the enclosure along with bottom portion 28 which extends the length of machine 10. The walls 18 and 22 are joined by side portions 31 and 32 which are joined on their lower side to bottom portion 28. It will be seen from FIG. 1 that side portions 31 and 32 extend less than half way up the walls 18 and 22, and the assembly of side portions 31 and 32 along with walls 18 and 22 and bottom portion 10 form an unenclosed holding cahmber 33 which is open to the atmosphere at the top. The chambers 23 and 33 bounded by the walls as described heretofore could be formed as a single piece unit, such as by casting, or the walls could be separate pieces joined together as by welding.

Figure 4:
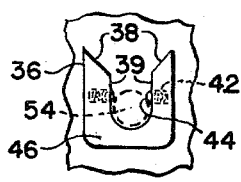
FIG. 4 is a view of one of the brackets that holds the cartridge and portable injection chamber in operative position.

On the holding chamber side of walls 18 and 22 a pair of U-shaped brackets 36 and 37 are respectively mounted. Each bracket is of a substantial thickness, and they form a cradle to receive and support a cylindrical container positioned therebetween. The top of the U of each bracket includes a pair of inclined surfaces 38, one on each side of the U sloping downwardly and inwardly so that the cylinder being inserted from above is easily guided to the base of the U. The intermediate inside surfaces 39 of the U are parallel and spaced apart a greater distance than the dimension of opening 17 for a purpose to be explained hereinafter. The bight of the U is formed on the inside as a semi-circle having a diameter equal to the cylinder to be supported therein. In each surface 39 a recess 42 is formed to receive a spring 43 and a locking ball 44 with the ball projecting partially outside surface 39. When a cylinder is guided down toward the bight 46 of the U-shaped bracket 36 or 37, the cylinder is forced over the balls 44 which thereupon move into the recesses 42 and compress the springs 43 and allow the cylinder to move down into contact with bight 46. In this operative position of the cylinder the balls move out into their normal station, as shown in FIG. 4, locking the cylinder (shown in dotted lines) in its operative position.

Figure 1:
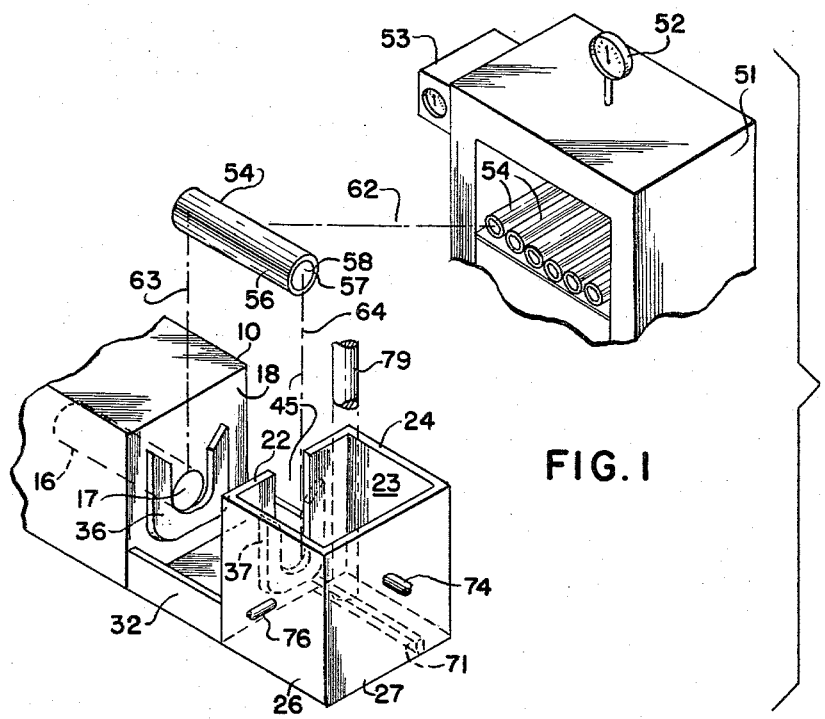
FIG. 1 is an isometric view of part of the injection molding machine and a remotely positioned heating unit of the present invention.

As shown in FIG. 1, a slot 45 is formed in wall 22. Slot 45 opens to the top of wall 22 and has a width substantially equal to the inside distance of the legs of the U-shaped bracket 37. The bottom of slot 45 is aligned and shaped to conform with the inside of the bight of bracket 37. It should also be pointed out that the bights of brackets 36 and 37 are horizontally aligned so that when a cylinder is placed in operative position in the brackets, it is horizontally aligned to receive ram 16 passing therethrough.

As shown in FIG. 1, a heating unit is remotely positioned from injection molding machine 10. Any conventional type of heating unit can be used, and for purposes of illustration we have shown an electric furnace 51 having a temperature indicator 52 and thermostat 53. Furnace 51 is illustrated as having a shelf in which a plurality of portable injection chambers 54 can be heated. The door of furnace 51 has not been shown for purposes of clarity.

Each portable injection chamber 54 comprises an outer metal casing 56 in which there can be removably inserted a metal cartridge 57 filled with thermoplastic material 58. The metal used in cartridge 57 is considerably softer than the metal used in outer casing 56 since the cartridge 57 is to be crushed by ram 16 while the casing 56 is to be reused with different cartridges 57. Therefore, it is seen from the isometric showing in FIG. 1 that the thickness of cartridge 57 is considerably less than the thickness of casing 56, and this thickness of casing 56 acts as a portable injection chamber to insulate and retain heat in cartridge 57 after the assembled cartridge and casing has been heated to the desired molding temperature in furnace 51.

In production cartridges 57 can be filled with various types of thermoplastic material that may vary in composition or color. Each filled cartridge 57 is then completely sealed with a weakened portion or point on one end so that this portion will easily fracture when in operative position upon being hit by the ram at the other end, and the heated thermoplastic material will thereupon flow easily into a flask as the cartridge is crushed.

The operation of the machine will now be described. The electric furnace is set to heat a plurality of portable injection chambers 54 to a desired molding temperature. The temperature is measured by temperature indicator 52 and maintained constant by the setting on thermostat 53. The filled portable injection chambers 54 may be in several groups, either of different colors or different compositions wherein the thermoplastic material becomes soft and workable at different desired molding temperatures. In such circumstances each group could be heated separately to its desired temperature. The primary consideration is that each filled portable injection chamber 54 is heated to its desired molding temperature and is available at this temperature in the furnace.

The injection machine 10 is now readied for a cyclic operation by positioning valve 13 so that piston 14 will be at its extreme left position as shown in FIG. 2 with piston ram 16 wholly inside ram assembly 11 and to the left of wall 18. An individual portable injection chamber 54 that has been heated to molding temperature is now lifted from furnace 51 and placed in the cradle formed by brackets 36 and 37. The path of movement is shown in FIG. 1 by the dotted lines 62, 63 and 64. In practice the furnace is located nearby the injection molding machine so that an operator wearing an insulated glove or using tongs can stand alongside the machine and pick the portable injection chambers 54 out of the furnace and immediately place them into the cradle of the injection molding machine.

As described hereinbefore, each portable injection chamber 54 is slid down into the brackets 36 and 37 until the spring balls 44 lock the portable injection chamber 54 in place. In placing the portable injection chamber in place the operator will make sure the weakened end portion of cartridge 57 is remotely placed from the ram, at the right end as viewed in FIG. 3. This is easily ascertained as the weakened end portion is clearly discernible on the cartridge 57.

When the portable injection chamber 54 is locked in position, one end of cartridge 57 abuts opening 17, which as mentioned previously is approximately the same size as the cartridge diameter. The inside dimension between the legs of the U-shaped bracket 36 is approximately equal to the outside diameter of the cylinder 56. Moreover, the measurement from the outside of wall 18 to the outside of wall 22 (indicated as L in FIG. 3) is equal to the length of cylinder 56. Therefore, when portable injection chamber 54 is locked in operative position, one end of cylinder 56 abuts wall 18 and the other end of cylinder 54 reaches through the thickness of wall 22 to be aligned with the other side thereof. The wall space around opening 17 between bracket legs 38 is just sufficient to allow cylinder 56 to abut wall 18 in tight fitting relation between legs 38.

A flask 67 is then placed in enclosure 23 as shown in FIG. 3. Flask 67 is conventionally constituted by a pair of fitted sections 68 and 69 which are matched together with a mold shape formed within. A sprue hole (not shown) leads from the inside of the mold to one end of the flask, and when the flask is positioned in chamber 23, the sprue hole is aligned with an imaginary line bisecting slot 45 so that it will be aligned with and in substantially abutting relationship with the end of cartridge 57 that has the weakened end portion when the portable injection chamber is placed in the cradle. This alignment is accomplished by first placing flask 67 against a fixed ridge plate 71 in the base of chamber 23. Plate 71 can be fixed in place by welding if desired when flasks of the same size are used, or it can be adjustable if different size flasks are used. The important consideration is that when flask 67 and the portable injection chamber 54 are in place, the sprue hole is to be aligned with the weakened end portion of cartridge 57. In practice the end of the flask with the sprue hole is pushed up against wall 22 and against the end of portable injection chamber 54 by a clamp 73 provided in wall 27. The clamp is then tightened against the opposite end of the flask by turning a crank handle 74 to securely fix flask 67 longitudinally in chamber 23. A clamp 76 provided in wall 26 is then tightened against the side of the flask by turning a clamp handle 77 to securely fix flask 67 against plate 71.

This step of placing a filled portable injection chamber 54 in operative position takes but a few seconds and having the thick metal cylinder 56 around cartridge 57 prevents heat loss so that the desired temperature of the thermoplastic material is retained during the entire cyclic operation. In other words, portable injection chamber 54 acts not only as a portable container for cartridge 57, but it also acts as an insulating chamber until the injection molding step is performed.

The operator next positions valve 13 and the air pressure drives ram 16 through the portable injection chamber 54 to the position shown in FIG. 3. The soft thermoplastic material is forced out the weakened end portion at the end of the cartridge as the ram moves through the cylinder and crushes the cartridge. The thermoplastic material forced out of the cartridge passes through the sprue hole of the flask and fills the mold to form the desired part. The operator will then position valve 13 to allow piston ram 16 to return to its retracted position as shown in FIG. 2. This can also be done by hydraulic or spring pressure. At this point in the cycle the operator will allow the mold to set for about a fifteen second interval before removing the flask from the machine. While he is waiting for this set to be completed, he can remove the portable injection chamber with the crushed cartridge within and knock out the crushed cartridge from the casing. One device for accomplishing this knock out step is provided by welding a knock out rod 79 to one corner of chamber 23. Rod 79 projects up sufficiently high so that cylinder 56 can be slid thereover in its entirety. As cylinder 56 slides over rod 79, the crushed cartridge 57 is thereby knocked out and a fresh thermoplastic material filled cartridge 57 can be immediately inserted in the empty portable injection chamber, which is then placed in the furnace for heating.

When the setting interval has passed, the operator will remove the flask with the formed mold. He will then insert a new flask in the injection machine and ready the machine to start the next cycle.

It is seen that a novel method and apparatus has been disclosed allowing continuous rapid manual cycles to be performed in an injection molding machine. The same portable injection chamber 54 can be reused for the same or different types of thermoplastic material, and successive cycles can use the same or different types of thermoplastic material in cartridge 57. This was not possible in the prior art where the heating chamber for the thermoplastic material was found in the injection machine so that a considerable length was required for each cycle, the time being lengthened by the need to separately heat each cartridge in the machine. If a hopper type machine was used, it had to be disassembled and purged of the one form of thermoplastic material before a different type of thermoplastic material could be used. Therefore, it is seen that a considerable saving in time is accomplished by the use of the present invention as a single manual process which formerly took fifteen to twenty minutes for a cyclic operation can now be accomplished in approximately fifteen seconds.

Although the illustrated embodiment shows and describes the use of an air cylinder, it will be understood that the source of power to actuate the ram could be hydraulic, air and hydraulic combined, spring, motor-driven or mechanical.

The particular embodiment of the invention illustrated and described is to be considered illustrative only. The present invention includes such other modifications and equivalents as may readily occur to those skilled in the art, within the scope of the appended claims.

It is claimed and desired to secure by Letters Patent:

1. Injection molding apparatus comprising a housing having an open side and a pair of walls extending inwardly within said housing from the other side, said walls having holding elements to slidingly receive therebetween in locking engagement a heated portable unit comprising a thin-walled cartridge adapted to hold a thermoplastic material and fitted within a thick-walled chamber for retaining the heat, and a piston ram assembly mounted in said housing and having a piston rod with a cross-sectional area of substantially the same size as said thin-walled cartridge, said piston rod adapted to be driven through said chamber to compress said cartridge and force the thermoplastic material into a molding form, and ejector means mounted on said housing to completely purge said chamber of said cartridge.

2. Injection molding apparatus comprising a housing having a plurality of walls extending inwardly within said housing from one side to form an open area exposed to the atmosphere, two of said walls being spaced to allow a heated portable unit to be placed therebetween, said portable unit comprising a thin-walled cartridge adapted to hold a thermoplastic material and fitted within a heat-retaining thick-walled chamber, said two walls having U-shaped locking elements mounted thereon and opening to the atmosphere to receive the portable unit in instantaneous locking relationship, a piston ram assembly mounted in said housing and having a piston rod with a cross-sectional area of substantially the same size as said thin-walled cartridge, said piston rod adapted to be driven through said chamber to compress said cartridge and force the thermoplastic material into a molding form, and ejector means mounted on said housing comprising an ejector rod having substantially the same cross-sectional area as said piston rod so that as said portable unit is slid over said ejector rod the chamber is completely purged of said cartridge.

3. Injection molding apparatus comprising a housing having a pair of walls intermediately spaced to divide said housing into three compartments comprising a first compartment at one end within which a piston ram assembly is mounted, a second compartment between said walls being open to the atmosphere on at least one side and having U-shaped elements juxtapositioned on said walls and opening to the atmosphere to lockingly receive a portable unit comprising a thin-walled cartridge adapted to hold a thermoplastic material and fitted within a heat-retaining thick-walled chamber, and a third compartment at the other end being open to the atmosphere on at least the same side as said second compartment, said third compartment having a stationary rod with a cross-sectional area of substantially the same area as the thin walled cartridge mounted within said housing and extending beyond said walls and further adapted to receive a molding form for being clamping abutted against one said wall, the piston rod of said assembly having substantially the same cross-sectional area of said stationary rod and being adapted to be driven through said chamber to compress said cartridge and force the thermoplastic material into said mold, and said stationary rod adapted to knock said compressed cartridge from said chamber when said portable unit is slid over said stationary rod.

References Cited by the Examiner

UNITED STATES PATENTS

| | | | |
|---|---|---|---|
| 536,240 | 3/95 | Tatum | 18—30 |
| 2,272,449 | 2/42 | Wacker | 206—56 |
| 2,287,277 | 6/42 | Ryder | 18—55 |
| 2,327,079 | 8/43 | Wacker | 18—55 XR |
| 2,338,607 | 1/44 | Wacker | 18—55 |
| 2,414,781 | 1/47 | Wacker | 206—56 |
| 2,570,284 | 10/51 | Stott et al. | 18—30 |
| 2,686,935 | 8/54 | Stott | 264—328 |
| 2,790,998 | 5/57 | Dimmer | 264—329 |

FOREIGN PATENTS 661,166  11/51  Great Britain.

ROBERT F. WHITE, *Primary Examiner.*

ALEXANDER H. BRODMERKEL, *Examiner.*